(12) United States Patent
Zhang et al.

(10) Patent No.: US 10,795,069 B2
(45) Date of Patent: Oct. 6, 2020

(54) LIGHT GUIDE PLATE USED FOR A BACKLIGHT MODULE OF AN LCD

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Qiang Zhang, Beijing (CN); Hui Dong, Beijing (CN); Mookeun Shin, Beijing (CN); Haifeng Xu, Beijing (CN); Xiaojun Wu, Beijing (CN); Zhenyu Han, Beijing (CN); Aixia Sang, Beijing (CN); Xiaochun Shi, Beijing (CN); Kaiwen Wang, Beijing (CN); Kai Wang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/413,789

(22) Filed: May 16, 2019

(65) Prior Publication Data

US 2020/0012032 A1    Jan. 9, 2020

(30) Foreign Application Priority Data

Jul. 9, 2018    (CN) .......................... 2018 1 0746180

(51) Int. Cl.
*F21V 8/00* (2006.01)
(52) U.S. Cl.
CPC ......... *G02B 6/0021* (2013.01); *G02B 6/0068* (2013.01)

(58) Field of Classification Search
CPC .. G02B 6/0021; G02B 6/0068; G02B 6/0011; G02F 1/133611; G02F 2001/133607; G02F 1/133606
See application file for complete search history.

(56) References Cited

U.S. PATENT DOCUMENTS 9,103,951 B2 * 8/2015 Yan ...................... G02B 6/0018
9,291,761 B2 * 3/2016 Bu ........................ G02B 6/0088
(Continued)

FOREIGN PATENT DOCUMENTS

CN    1523420 A    8/2004
CN    202305872 U    7/2012
(Continued)

OTHER PUBLICATIONS

First Office Action for Chinese Patent Application No. 201810746180.6 dated Oct. 11, 2019.

*Primary Examiner* — Tracie Y Green
(74) *Attorney, Agent, or Firm* — Calfee, Halter & Griswold LLP (57) ABSTRACT

A light guide plate includes a body region and a light incident region. The body region has a light exiting surface, an opposite base surface, and a side surface between the light exiting surface and the base surface. The light incident region is located at the side surface of the body region for receiving incident light and includes projections protruding outwards from the side surface of the body region, and a cavity is defined between adjacent projections. Each projection has a top surface and outer side walls. The outer side walls also define inner side walls of each cavity together with a bottom surface. The top surface, side walls, and bottom surface together are a light incident surface of the light incident region. An angle between the top surface and each outer side wall is called an apex angle, which is greater than 90 degrees.

9 Claims, 3 Drawing Sheets

(56) References Cited

U.S. PATENT DOCUMENTS

| | | |
|---|---|---|
| 2008/0049168 A1 | 2/2008 | Kubota |
| 2011/0242846 A1* | 10/2011 | Park .................. G02B 19/0066 362/613 |
| 2012/0033447 A1* | 2/2012 | Hashino ............... G02B 6/0086 362/612 |
| 2012/0044715 A1 | 2/2012 | Tsai et al. |
| 2013/0163278 A1* | 6/2013 | Wang .................. G02B 6/0031 362/606 |
| 2016/0252667 A1* | 9/2016 | Zhu ....................... G02B 6/003 362/608 |

FOREIGN PATENT DOCUMENTS

| | | |
|---|---|---|
| CN | 206248878 U | 6/2017 |
| JP | 2008053013 A | 3/2008 |

\* cited by examiner

Fig.6

LIGHT GUIDE PLATE USED FOR A BACKLIGHT MODULE OF AN LCD

CROSS REFERENCE TO RELATED APPLICATIONS

This application claims priority to Chinese patent application No. 201810746180.6 filed on Jul. 9, 2018, the entire content of which is incorporated herein by reference.

TECHNICAL FIELD

The present disclosure relates to the technical field of display, in particular to a light guide plate, a backlight module and a display device.

BACKGROUND

As display devices, liquid crystal modules have been widely used in mobile phones, notebook computers, tablet computers, digital cameras, onboard displays, liquid crystal televisions and other electronic products. The liquid crystal module is mainly composed of a liquid crystal panel and a backlight module, wherein the backlight module is usually assembled on the back side of the liquid crystal panel to provide uniform and high-brightness backlight to the liquid crystal panel. The basic principle of backlight module is to convert the commonly used linear light source or point light source into surface luminaire assembly with high brightness and uniform distribution through an effective optical mechanism, so that the liquid crystal panel can normally display images.

A typical side incidence backlight module regards a single LED (Light Emitting Diode) as a point light source, a plurality of LEDs arranged in a single row as a linear light source, the linear light source is assembled at one side of a light guide plate, and the linear light source can be converted into a relatively uniform surface light source through refraction, total reflection and reflection by using the light guide plate and a reflector. At present, the light incident surface of a typical light guide plate is a flat surface. When the light guide plate and the LED are assembled, a reasonable distance needs to be reserved between the light incident surface of the light guide plate and the LED lamp bead. Research shows that when the distance is relatively large, the light utilization rate is low. With the decrease of the distance, the light utilization rate will increase correspondingly. However, if the distance is too small, it will lead to undesirable problems of increasing risks of hotspot (i.e., because the range of the light emitting angle (or divergence angle) of the LED light source is limited, a bright light beam area will appear in the area of the light guide plate close to the LED light source, thus causing the phenomenon of uneven brightness and darkness of the exited light from the backlight module), dark corner (i.e., the phenomenon of darkening at four corners of the light exiting surface of the backlight module) and poor lamp bead interference risk and the like.

SUMMARY

In view of this, the present disclosure provides a light guide plate including:

a body region having a light exiting surface, a base surface opposite to the light exiting surface, and a side surface located between the light exiting surface and the base surface; and a light incident region located at the side surface of the body region for receiving incident light;

wherein the light incident region comprises a plurality of projections protruding outwards from the side surface of the body region, a cavity is defined between two adjacent projections, each of the projections is provided with a top surface and an outer side wall, the outer side wall of the projection also serve as an inner side wall of the cavity, the cavity is provided with a bottom surface, Wherein the top surface, the side walls and the bottom surface together serve as a light incident surface of the light incident region for receiving incident light, and angles included between the top surface and the outer side walls of each of the projections are called apex angles each of which is greater than 90 degrees.

According to one aspect of the present disclosure, the apex angle is between 90 and 120 degrees.

According to one aspect of the present disclosure, the bottom surface has an arc surface shape recessed toward the body region.

According to one aspect of the present disclosure, the light incident region is configured to receive incident light from a linear light source parallel to both the light exiting surface of the body region and the top surface of the projection, and a plane parallel to the linear light source and perpendicular to the top surface is called a virtual plane, a cross section of the projection along the virtual plane is trapezoidal, and the width of the trapezoid gradually increases from one end close to the light source to one end away from the light source.

According to one aspect of the present disclosure, the light guide plate is made of at least one of polymethyl methacrylate, silicone modified polyether adhesive and glass.

According to one aspect of the present disclosure, the linear light source comprises a plurality of point light sources, each of which is aligned with a corresponding cavity.

According to one aspect of the present disclosure, the linear light source comprises a plurality of point light sources, each of which is at least partially accommodated in a corresponding cavity.

The present disclosure also provides a backlight module including the light guide plate described in any one of the above aspects and a linear light source facing the light incident surface of the light guide plate.

According to one aspect of the present disclosure, the linear light source is a light bar, and a plurality of point light sources are arranged at a side of the light bar facing the light entering surface, each point light source is aligned with a corresponding cavity. The light emitting angle of each point light source is about 120 degrees.

According to one aspect of the present disclosure, the linear light source is a light bar, and a plurality of point light sources are disposed on a side of the light bar facing the light incident surface, each point light source being at least partially accommodated in a corresponding cavity. The light emitting angle of each point light source is about 120 degrees.

According to one aspect of the present disclosure, the top surface, the side walls, and the bottom surface are all spaced apart from the linear light source by a distance. The distance is, for example, 0.1-0.2 mm, optionally 0.1-0.4 mm.

According to one aspect of the present disclosure, the light emitting angle of each point light source is about 120 degrees.

BRIEF DESCRIPTION

DETAILED DESCRIPTION

In order that the above objects, features and advantages of the present disclosure can be more clearly understood, the present disclosure will be described in further detail below with reference to the accompanying drawings and detailed description.

After unremitting research and development efforts, the inventor of the present disclosure determined that a reasonable distance between the light incident surface of the light guide plate and the light source is 0.1 to 0.4 mm. Research shows that when the distance is relatively large, for example, greater than 0.4 mm, the light utilization rate will be less than 65%. With the decrease of the distance, the utilization rate of light will increase correspondingly. However, when the distance is too small, for example, less than 0.1 mm, it will cause undesirable problems of increasing risks of hotspots (i.e., because the range of the light emitting angle (or divergence angle) of the LED light source is limited, a bright light beam area will appear in the area of the light guide plate close to the LED light source, thus causing the phenomenon of uneven brightness and darkness of the exited light from the backlight module), dark corner (i.e., the phenomenon of darkening at four corners of the light exiting surface of the backlight module) and poor lamp bead interference risk and the like.

The present disclosure provides a light guide plate, a backlight module including the light guide plate, and a display device including the backlight module, to solve the problems that in the prior art, when the distance between the light incident surface of the light guide plate and the LED lamp bead is large (for example, 0.4 mm), the light utilization rate is low, and as the distance decreases, the risks of defects such as hotspot, dark corners, and poor lamp bead interference increase.

Figure 1:
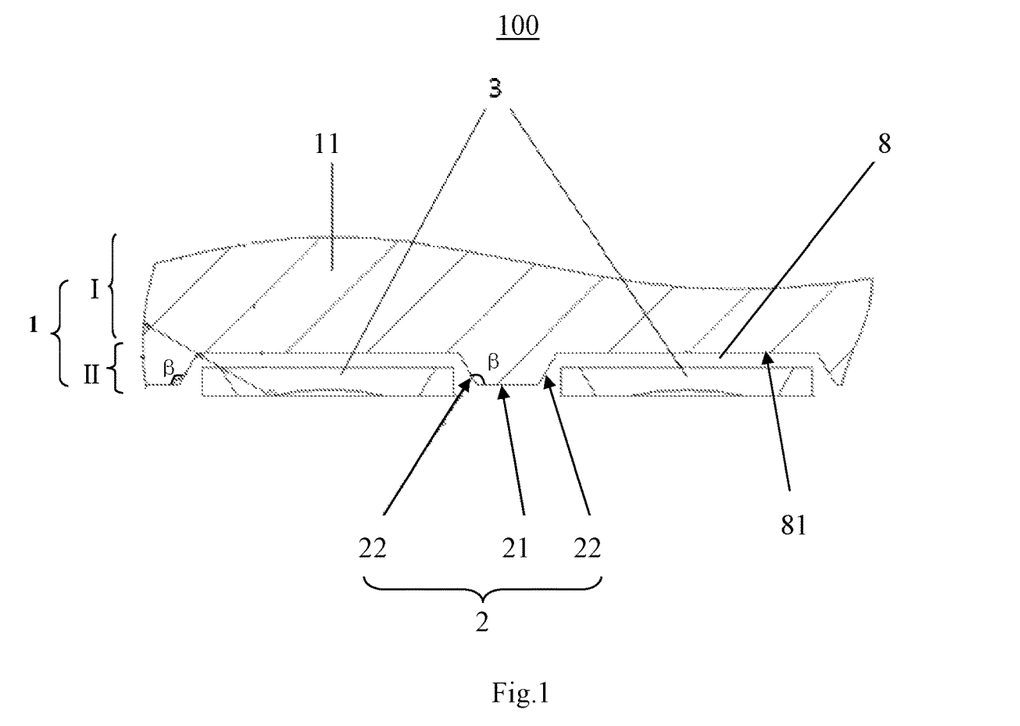
FIG. 1 shows a schematic structural view of a backlight module provided by some embodiments of the present disclosure.

Referring to FIG. 1, a structural schematic view of a side incidence backlight module 100 provided by some exemplary embodiments of the present disclosure is shown. The backlight module 100 includes a light guide plate 1 and light emitting elements 3 located at one side of the light guide plate 1.

The light guide plate 100 includes: a body region I having a light exiting surface 11 and a base surface opposite to the light exiting surface 11, and a side surface located between the light exiting surface 11 and the base surface; and a light incident region II located at the side surface of the body region I for receiving incident light. The light incident region II includes a number of projections 2 protruding outward from the side surface of the body region I, a cavity (or a recess) 8 is defined between two adjacent projections 2, and each projection 2 has a top surface 21 and two outer side walls 22. The outer side walls 22 extend from the perimeter of the top surface 21 toward the body region I of the light guide plate 1. The outer side wall 22 of the projection 2 also serves as an inner side wall of the cavity 8, and each cavity 8 has a bottom surface 81. The top surface 21, the side wall 22 and the bottom surface 81 together serve as the light incident surface of the light incident region II for receiving incident light. An angle β included between the top surface 21 and each outer side wall 22 of each projection 2 is called an apex angle, which is greater than 90 degrees, for example, the apex angle is between 90 degrees and 120 degrees.

It should be noted that dividing the light guide plate 100 into the body region I and the light incident region II does not necessarily mean that the two regions are structurally separated. In fact, the body region I and the light incident region II can be two parts with different functions of a single element, and can be integrally molded or formed by one-step processing during manufacturing. Of course, it can also be an assembly of two different separate elements processed separately and then assembled together.

In order to better understand the inventive concept of the present disclosure, the orientation and function of the light exiting surface 11 and the base surface of the light guide plate 100 will be explained as follows with reference to FIGS. 1, 2 and 4: the light exiting surface 11 is a surface of the light guide plate 1 facing the observer in the paper surface of FIGS. 1, 2 and 4; the base surface is a bottom surface (invisible) of the light guide plate facing away from the observer in FIGS. 1, 2 and 4. The incident light is incident into the body region I from the light incident region II of the light guide plate 1, and then exits the light exiting surface 11 after being reflected by the base surface, or directly exits the light exiting surface 11 without being reflected by the base surface to illuminate a display panel (not shown).

Optionally, the bottom surface 81 of the cavity 8 may have an arc surface shape recessed toward the body region I.

Figure 2:
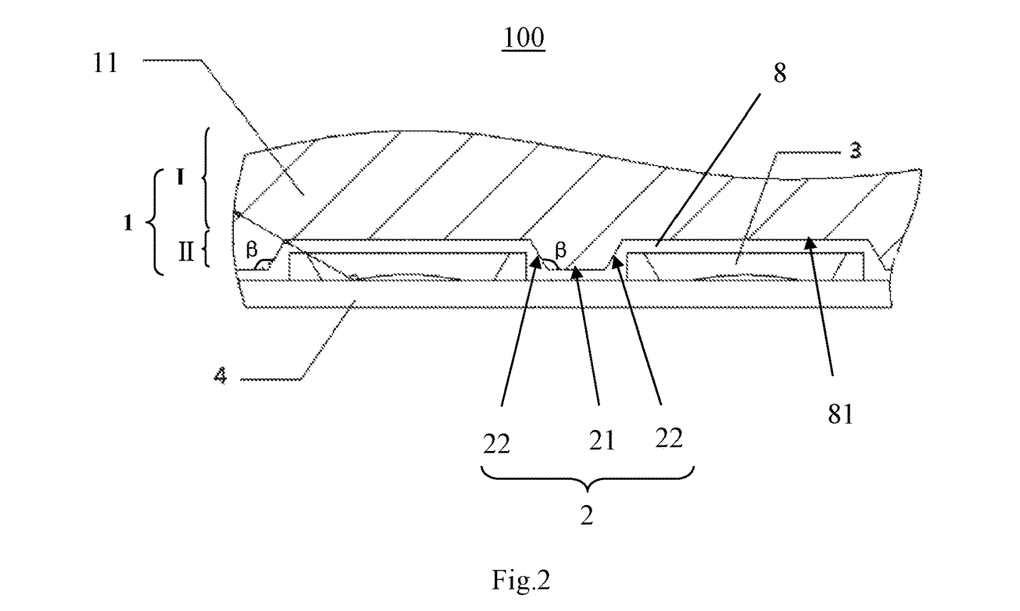
FIG. 2 shows a schematic structural view of a backlight module provided by some embodiments of the present disclosure.

As shown in FIG. 2, the light incident region II is configured to receive incident light from a linear light source (e.g., an LED light emitting light bar) 4 parallel to both the light exiting surface 11 of the body region I and the top surface 21 of the projection 2. A plane parallel to the linear light source 4 and perpendicular to the top surface 21 is called a virtual plane, and the cross section of the projection 2 along the virtual plane is trapezoidal, and the width of the trapezoid gradually increases from one end close to the light source 4 to one end away from the light source 4.

The light guide plate 1 is made of at least one of polymethyl methacrylate, silicone modified polyether adhesive and glass.

Figure 6:
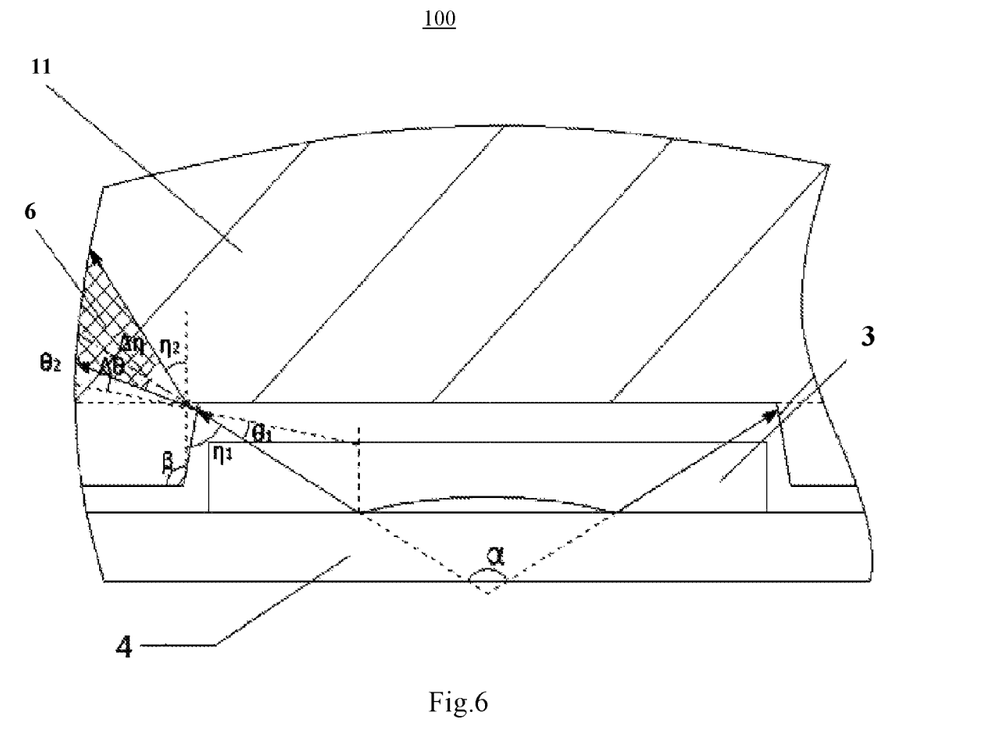
FIG. 6 shows a schematic structural view of a horizontal section of a backlight module provided by some embodiments of the present disclosure, wherein a path of light propagation is shown.

The side of the linear light source 4 facing the light incident region II is provided with a plurality of point light sources 3, each of which is aligned with a corresponding cavity 8. Alternatively, each point light source 3 is at least partially accommodated in a corresponding cavity 8. It should be noted that, as shown in FIG. 6, the light emitting angle (or divergence angle or opening angle) α of each point light source 3 is determined by installation or manufacturing process, for example, it is about 100-140 degrees. This application is illustrated and deduced by taking the light emitting angle of 120 degrees as an example.

As shown in FIGS. 2 to 6, the inventors of the present application have determined that when the light emitting angle is 120 degrees and the angle (i.e., the apex angle) included between the top surface 21 and the outer side wall 22 of the projection 2 is 120 degrees, the incident ray is perpendicular to the outer side wall 22 of the projection 2, and then the light will not deflect after being refracted into the light guide plate 1, i.e., it does not have the effect of further divergence of the light. Therefore, the 120° apex angle of the projection 2 is called a critical angle of the apex angle. When the light emitting angle is 120 degrees and the apex angle of the projection 2 is greater than or equal to 90 degrees and less than 120 degrees, it is inevitable that the refraction angle of the light ray is smaller than the incident angle, i.e. it has the beneficial effects of more divergent exiting light ray, thereby reducing hotspot.

The light incident surface formed by the top surface 21, the side walls 22 of the projection 2 and the bottom surface 81 of the cavity 8 is spaced apart from the linear light source 4 by a certain distance. The distance is 0.1-0.4 mm, for example 0.1-0.2 mm. The distance of 0.1-0.2 mm can not only ensure high light utilization rate, for example, as high as more than 80%, but also has beneficial effects of reducing the defects of hotspot, dark corner and poor lamp bead interference.

Please refer to FIGS. 1-6 together. In operation, after part of the light emitted from each light emitting element 3 is incident into the light incident surface of the light guide plate 1, part of the light is deflected toward the normal direction after being refracted, i.e. the refraction angle is smaller than the incident angle, making the light more divergent. In this way, when the distance between the light incident surface of the light guide plate and the light emitting element is reduced, the risks of defects such as hotspot, dark corner and poor lamp bead interference will be reduced.

In some alternative embodiments of the present disclosure, the apex angle is between 90 and 120 degrees, and the selection of the angle range of the apex angle will be described in detail later and will not be described in detail here.

In other alternative embodiments of the present disclosure, the bottom surface (also the light incident surface) of the cavity 8 between two adjacent projections 2 is an arc-shaped structure (not shown in the Figure) recessed into the light guide plate 1, which can increase the total reflection rate of incident light, reduce the risk of lamp bead interference, increase the light utilization rate, and reduce the cost.

In other alternative embodiments of the present disclosure, the cross section of the projection 2 along a virtual plane may be a trapezoidal structure, and the virtual plane is a plane parallel to the linear light source 4 and perpendicular to the top surface 21, that is, the virtual plane is perpendicular to the top surface 21 and parallel to a line connecting each light emitting element 3. The width of the trapezoidal structure gradually increases from one end close to the light incident surface to one end away from the light incident surface, so that the two side walls 22 of the trapezoidal structure and the top surface of the projection 2 can form two apex angles each of which is more than 90 degrees, and further after the light emitted from each light emitting element 3 enters the light incident surface of the light guide plate 1, part of the light is deflected towards the normal direction after being refracted, i.e. the refraction angle is smaller than the incident angle, so that the light is more divergent. In this way, when the distance between the light incident surface of the light guide plate 1 and the light emitting element 3 is reduced, the risks of defects such as hotspot, dark corner and poor lamp bead interference are reduced. Therefore, the risks of defects such as hotspot, dark corner and poor lamp bead interference can be reduced while the distance between the light incident surface of the light guide plate 1 and the light emitting element 3 is reduced.

In other alternative embodiments of the present disclosure, the light guide plate 1 is made of at least one of polymethyl methacrylate, silicone modified polyether glue, glass and other materials. The refractive indices of the above materials are greater than the refractive index of air. Therefore, after the light emitted from each light emitting element 3 enters the light incident surface of the light guide plate 1, the direction of the light will be deflected after being refracted, so that the light will be more divergent, and the proportion of total reflected light can be increased.

According to the light guide plate 1 provided by some exemplary embodiments of the present disclosure, by arranging a plurality of projections 2 at one side of the light incident surface of the light guide plate 1, a cavity 8 is defined between two adjacent projections, which can accommodate the light emitting elements 3. Two side walls 22 of each projection 2 and a plane on which the top surface 21 is located form two apex angles each of which is greater than 90 degrees. In some embodiments of the present disclosure, the projections 2 may partition adjacent light emitting elements 3. Since the two side walls 22 of each projection 2 and the top surface 21 form apex angles each of which is more than 90 degree, after the light emitted from each light emitting element 3 enters the light guide plate 1, the light is deflected toward the normal (or normal plane) direction, i.e., the light is more divergent, thereby reducing the risks of defects such as hotspot, dark corners and poor lamp bead interference while reducing the distance between the light incident surface of the light guide plate 1 and the light emitting element 3.

Referring to FIG. 2, there is shown a schematic structural view of a backlight module 100 provided by some exemplary embodiments of the present disclosure. As shown in FIG. 2, the backlight module 100 may include a light guide plate 1 according to any of the above embodiments or examples; and a light bar 4. The light bar 4 is arranged facing the light incident surface of the light guide plate 1, and a plurality of light emitting elements 3 are arranged on the side of the light bar 4 facing the light incident surface of the light guide plate 1.

The light guide plate 1 may include a body region I and a light incident region II including a plurality of projections 2. Two side walls 22 of each projection 2 and the plane on which the top surface 21 is located form apex angles greater than 90 degrees and less than 120 degrees. Next, the selection of the apex angle range in some exemplary embodiments of the present disclosure will be described in the following manner.

Figure 3:
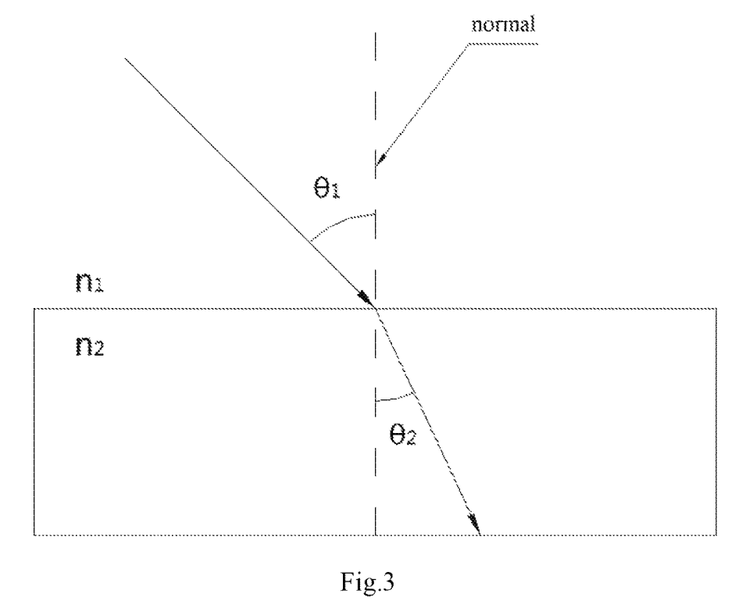
FIG. 3 shows a schematic view explaining a light ray refraction principle provided by some embodiments of the present disclosure.

Referring to FIG. 3, there is shown a schematic view of light ray refraction principle provided by some exemplary embodiments of the present disclosure. As shown in FIG. 3, $n_1$ represents the refractive index of air, $n_2$ represents the refractive index of light guide plate, $\theta_1$ represents the incident angle of light ray, $\theta_2$ represents the refraction angle of light ray after being refracted. The following equation can be obtained from refraction law.

$$n_1 * \sin \theta_1 = n_2 * \sin \theta_2 \quad (1)$$

In some exemplary embodiments of the present disclosure the apex angles β are set to 90° and 120°, two respective critical conditions. It should be noted that, as shown in FIG. 6, the light emitting angle (or divergence angle or opening angle) α of each point light source 3 is determined by installation or manufacturing process, for example, it is about 100-140 degrees. This application is illustrated and deduced by taking the light emitting angle of 120 degrees as an example.

Taking FIG. 2 as an example, when the apex angle is 120°, the incident ray emitted from the light emitting element 3 is perpendicular to the side wall 22 of the projection 2. According to the above equation (1): $n_1 * \sin \theta_1 = n_2 * \sin \theta_2$, it can be obtained that the light emitted from the light emitting element 3 will not be deflected after being refracted, i.e., the increased value of the light emitting angle after being refracted, i.e., the deflection angle $\Delta\theta = \theta_1 - \theta_2 = 0°$.

Figure 4:
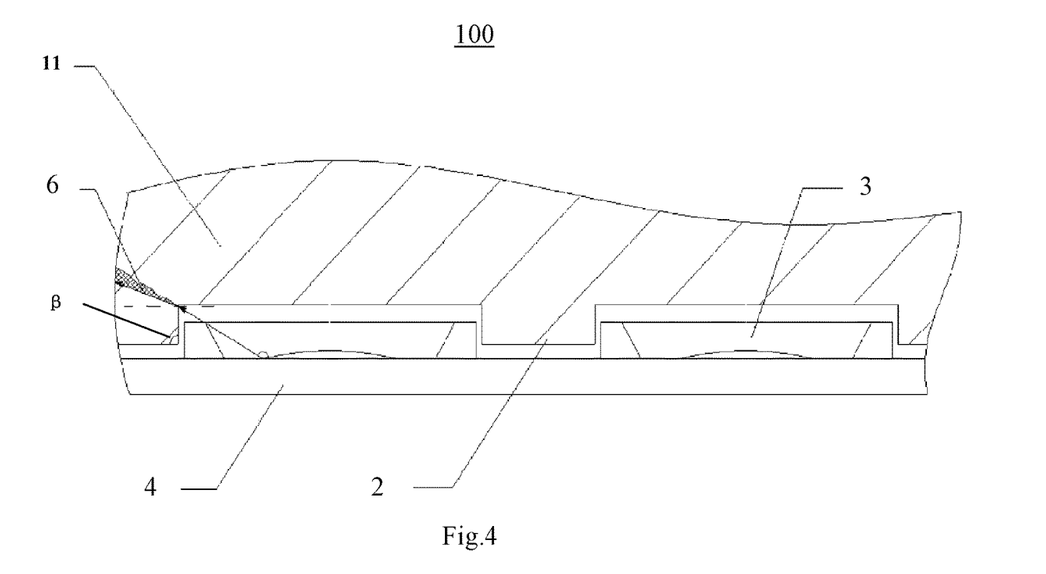
FIG. 4 shows a schematic structural view of a backlight module provided by some embodiments of the present disclosure, wherein the apex angle of the projection of the light guide plate is 90 degrees.

Let's refer to FIG. 4, showing a schematic structural view of a backlight module with an apex angle of 90° according to some exemplary embodiments of the present disclosure. The shaded region 6 shows an increased area of the light emitting angle after being refracted. When the apex angle is 90°, according to the above equation (1): $n_1 * \sin \theta_1 = n_2 * \sin \theta_2$, the incident angle $\theta_1 = 30°$, the refraction angle $\theta_2 = 19.6°$, then the increased value of the light emitting angle after being refracted, i.e., the deflection angle $\Delta\theta = \theta_1 - \theta_2 = 10.4°$.

According to the above two critical conditions, it can be inferred that if 90°<apex angle<120°, the refractive index of the light guide plate is 1.49 (greater than the refractive index of air), then:

$$n_1 * \sin \theta_1 = n_2 * \sin \theta_2 \quad (1)$$

$$n_1 = 1, n_2 = 1.49 \quad (2)$$

$$0 < \theta_1 < 30°, 0 < \theta_2 < 19.6° \quad (3)$$

$$\Delta\theta = \theta_1 - \theta_2 \quad (4)$$

According to the above equations (1), (2), (3) and (4), the value range of the deflection angle $\Delta\theta$ is (0, 10.4°).

Moreover, according to the above two critical conditions, if the apex angle is less than 90, the smaller the apex angle is, the larger the $\theta_1$ is, the larger the deduced $\Delta\theta$ is, the larger the light refraction angle is, and the better the divergence effect is. However, the inventors have determined that when the apex angle is less than 90 degrees, the pitch value of each point light source 3 in the light bar 4, i.e. the spacing between adjacent light emitting elements 3, needs to be considered. The spacing between light emitting elements 3 is determined by the size of the display device and the required picture brightness, as well as the number, current, voltage and power consumption of light emitting elements 3 collectively. The common reasonable range is between 1 mm and 4 mm. The larger the value, the greater the risk of hotspot. Considering that the light guide plate requires a 0.6 to 1 mm gap for movement, when the spacing between the light emitting elements 3 is greater than 2 mm, the apex angle of the projection may be considered to set to be greater than 90°.

During development, the inventors determined that if the apex angle is more than 120°, the angle of the light with maximum angle becomes smaller after being refracted, and there is a risk of aggravating hotspot at the light bar side.

Therefore, in some exemplary embodiments of the present disclosure, an apex angle range of 90 degrees to 120 degrees can be considered.

In some alternative embodiments of the present disclosure, the shape of the bottom surface 81 of the cavity 8 facing each light emitting element 3 may be set according to the shape of the light emitting surface of each light emitting element 3, for example, the bottom surface may be set as an arc-shaped surface. The arc-shaped surface does not contact with each light emitting element 3, and the calculating of the radius of the arc-shaped structure needs to consider the heat generation amount of the light emitting element 3, as well as the expansion amount and dimensional tolerance of the light guide plate 1. The inventors determined that a reasonable distance between the light emitting surface of each light emitting element 3 and the light incident surface of the light guide plate is 0.1~0.4 mm. The larger the value, the lower the light utilization rate, and the smaller the distance, the larger the light utilization rate, correspondingly the greater the risks of defects such as hotspot, dark corner and poor lamp bead interference at the same time. Therefore, if the minimum distance between the arc-shaped surface and the surface of the light emitting element 3 is a, the maximum distance is A, and the thickness of the light guide plate (i.e., the distance between the light exiting surface 11 and the base surface) is L, then the radius R of the arc-shaped surface is calculated as follows:

$$R^2 = (R-(A-a))^2 + (H/2)^2 \quad (5)$$

$$\tan(\alpha/2) = (H-h)/2A \quad (6)$$

If the light emitting angle α, luminous length h, minimum distance a and maximum distance A of the light bar are known, then it can be inferred:

$$R = (A-a)/2 + [2A \tan(\alpha/2) + h]^2 / [8*(A-a)] \quad (7)$$

According to the above equations (5), (6) and (7), it can be obtained that the radius of the arc-shaped surface is related to the heat generation amount of the light emitting element 3, the expansion amount and the dimensional tolerance of the light guide plate, while the specific value of the radian of the arc-shaped surface is not limited by the embodiment of the present disclosure.

Figure 5:
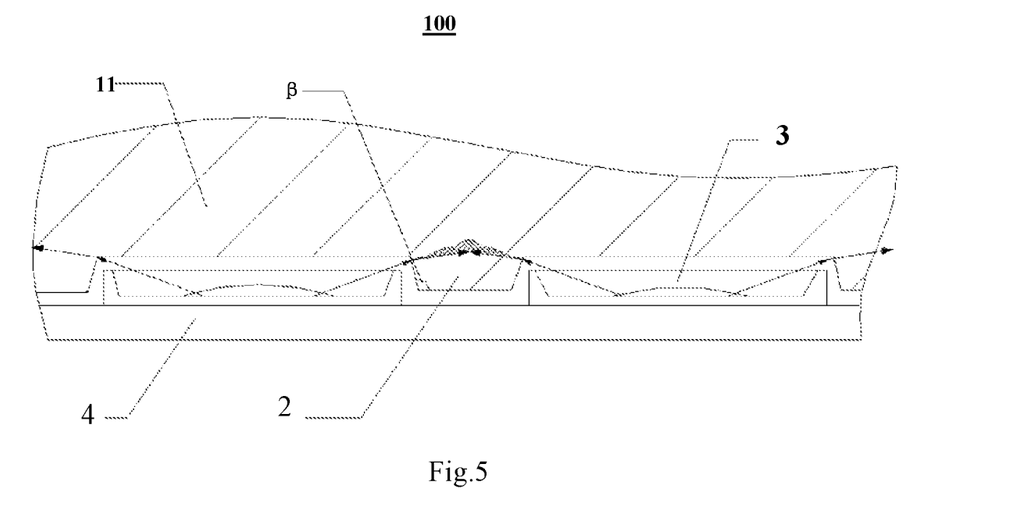
FIG. 5 shows a schematic structural view of a horizontal section of a backlight module provided by some embodiments of the present disclosure.

Further, the surface radian of the arc-shaped surface is set according to the light emitting surface of the light emitting element 3. If the light emitting angle of the light emitting element 3 is 120°, optionally A is 0.35 mm, a is 0.1 mm, h is 1.6 mm, and the calculated thickness of the light guide plate is 3.0 mm, then R=4.625 mm, which then can play a role of collecting light. Referring to FIG. 5, there is shown a schematic structural view of a horizontal section of a backlight module provided by some exemplary embodiments of the present disclosure. As shown in FIG. 5, the surface radian of the arc-shaped surface is related to the incident angle of light emitted from the light emitting element 3, the incident distance between the light emitting element 3 and the top surface 21 of the projection 2 of the light guide plate 1, the light emitting angle, and the thickness of the light guide plate, etc. However, the embodiment of the present disclosure does not restrict the specific value of the surface radian.

In other alternative embodiments of the present disclosure, the top surface 21, the two side wall surfaces, and the arc-shaped surface of each projection 2 all have reserved gaps from the light bar 4.

In other alternative embodiments of the present disclosure, a portion at one end of each projection 2 away from the top surface 21 may contact the light bar 4 to limit each light emitting element. Of course, the height of the projection 2 may be 0.1 mm to 0.2 mm larger than the height of the facing light emitting element 3, and each light emitting element 3 is limited by the projection 2 in contact with the light bar 4.

In practical application, a person skilled in the art can limit the light emitting element 3 by either of the above two ways or by other ways. The embodiment of the present disclosure will not be limited in this regard.

Advantages of the structure employed by some exemplary embodiments of the present disclosure are described below with reference to FIG. 6.

Referring to FIG. 6, there is shown a schematic view of a horizontal section of a backlight module provided by some exemplary embodiments of the present disclosure, wherein a light running path is shown. The light emitting angle of the light emitting element 3 is α, and the apex angle of the projection 2 is β. According to the principle of light refraction, light obliquely enters the light guide plate from air, that is, the refraction angle (the side with large refractive index) is smaller than the incident angle (the side with small refractive index).

The structure adopted by some exemplary embodiments of the present disclosure has the effect of increasing the light emitting angle of each light emitting element 3. Compared with the light incident surface of a common planar light guide plate parallel to the linear light source 4, the increased light emitting angle $\Delta\alpha$ is calculated specifically as follows:

$$\Delta\alpha = (\Delta\theta + \Delta\eta)*2 \quad (9)$$

$$\Delta\theta = \theta_1 - \theta_2 \quad (4)$$

$$\Delta\eta = \eta_1 - \eta_2 \quad (10)$$

$$\theta_1 = \pi - \alpha/2 - \beta \quad (11)$$

$$\eta_1 = \alpha/2 \quad (12)$$

$$n_1 * \sin\theta_1 = n_2 * \sin\theta_2 \quad (1)$$

According to the above equations (1), (4), (8), (9), (10) and (11), then it can be inferred:

$$\Delta\theta = \pi - \alpha/2 - \beta - \arcsin[n_1/n_2 * \sin(\pi - \alpha/2 - \beta)]$$

$$\Delta\eta = \alpha/2 - \arcsin[n_1/n_2 * \sin(\alpha/2)]$$

$$\Delta\alpha = 2\pi - 2\beta - 2\arcsin[n_1/n_2 * \sin(\pi - \alpha/2 - \beta)] + 2\arcsin[n_1/n_2 * \sin(\alpha/2)]$$

It can be seen that $\Delta\alpha$ is an increasing function of β, and some exemplary embodiments of the present disclosure can increase the light emitting angle of the light emitting element 3 by setting the apex angle β to be greater than 90°, which can increase the light emitting angle of the light emitting element 3, thereby greatly alleviating the defects such as hotspot and dark corner of the backlight module.

According to the backlight module provided by some exemplary embodiments of the present disclosure, by arranging a plurality of projections 2 at one side of the light incident surface of the light guide plate 1, a cavity 8 is defined between two adjacent projections 2, which can accommodate light emitting elements. The two side walls 22 of each projection 2 and a plane where the top surface 21 of the projections 2 are located form apex angles each of which greater than 90 degrees respectively. Some exemplary embodiments of the present disclosure can partition the adjacent light emitting elements, and since the two side walls 22 and the top surface 21 of each projection 2 form apex angles each of which is greater than 90 degrees, the light emitting angle after being refracted can be increased. Specifically, after the light emitted from each light emitting element 3 enters the light guide plate 1, the light deflects toward the normal direction, i.e., the incident angle increases, thereby reducing the risk of defects such as hotspot, dark corner and poor lamp bead interference while reducing the distance between the light incident surface of the light guide plate and the light emitting element.

In other embodiments of the present disclosure, a display device is also disclosed, which includes the backlight module described in any of the above embodiments or examples.

Compared with the prior art, the present disclosure includes the following advantages:

The embodiments of the present disclosure provide a light guide plate, a backlight module and a display device. A plurality of projections are arranged at one side of the light incident surface of the light guide plate, a cavity is defined between two adjacent projections, which can accommodate light emitting elements. Each of the angles (i.e., the apex angles of the projections) included between the top surface and the outer side walls of each projection is greater than 90°, so that adjacent light emitting elements can be partitioned, and the light emitting angle (i.e., divergence angle) of each light emitting element can be increased. After the light emitted from each light emitting element enters the light guide plate, the refracted light is deflected towards the normal direction, i.e., the angle of light is more divergent. According to the light guide plate disclosed by come embodiments, the distance between the light incident surface of the light guide plate and the light emitting element can be reduced, for example, the risks of defects such as hotspot, dark corner and poor lamp bead interference can be reduced at the same time. Each embodiment in this specification is described in a progressive manner. What each embodiment focuses on is the difference from other embodiments. The same and similar parts between each embodiment can be referred to each other.

Finally, it should also be noted that in this context, relational terms such as first and second, etc. are only used to distinguish one entity or operation from another entity or operation, and do not necessarily require or imply any such actual relationship or order between these entities or operations. Moreover, the terms "include," "comprise," or any other variation thereof, are intended to cover a non-exclusive inclusion, such that a process, method, article, or device that comprises a list of elements includes not only those elements but also other elements not expressly listed or elements inherent to such process, method, article, or device. Without further restrictions, an element defined by the statement "includes a(an) . . . " does not exclude the presence of other identical element in a process, method, article, or device that includes the element.

A light guide plate, a backlight module and a display device provided by the present disclosure have been described in detail above. In this context, specific examples are adopted to explain the principle and implementation of the present disclosure. The above examples are only used to help understand the method of the present disclosure and its core ideas. At the same time, for those of ordinary skill in the art, there will be changes in the specific implementation and application scope according to the idea of this disclosure. To sum up, the contents of this specification should not be construed as limiting the disclosure.

The invention claimed is:

1. A backlight module comprising:
a light guide plate comprising:
- a body region having a light exiting surface, a base surface opposite to the light exiting surface, and a side surface located between the light exiting surface and the base surface;
- a light incident region located at the side surface of the body region for receiving incident light, the light incident region comprising:
  - a plurality of projections protruding outward from the side surface of the body region, each projection having a top surface and outer side walls, wherein apex angles included by the top surface and the outer side walls of each of the projections is in a range from about 90 degrees to about 120 degrees; and
  - a plurality of cavities each defined between two adjacent projections, each cavity comprising a bottom surface and inner side walls, wherein the inner side walls of the cavities are formed by the outer side walls of the adjacent projections, the bottom surface has an arc surface shape recessed inwards toward the body region; and
- a light incident surface of the light incident region formed by the combination of the top surfaces of the projections, the outer side walls of the projections, and the bottom surfaces of the cavities, wherein the light incident surface receives incident light;
wherein the light guide plate is made of silicone modified polyether adhesive; and
a linear light source comprising a plurality of point light sources, wherein the linear light source faces the light incident surface of the light guide plate and is configured so that a light emitting angle of each point light source is about 120 degrees and is increased by about 0 degrees to about 10.4 degrees after being refracted by the light incident surface;
wherein the light incident surface of the light incident region is spaced apart from the linear light source by a distance of about 0.1 millimeter to about 0.4 millimeter.

2. The backlight module according to claim 1, wherein the light incident region is configured to receive incident light from a linear light source parallel to both the light exiting surface of the body region and the top surface of the projection, and a plane parallel to the linear light source and perpendicular to the top surface is called a virtual plane, a cross section of the projection along the virtual plane is in shape of a trapezoid, and a width of the trapezoid gradually increases from one end close to the light source to one end away from the light source.

3. The backlight module according to claim 1, wherein the linear light source is a light bar, and the plurality of point light sources are arranged at a side of the light bar facing the light incident surface, and each point light source is aligned with a corresponding cavity.

4. The backlight module according to claim 1, wherein the linear light source is a light bar, and the plurality of point light sources are arranged at a side of the light bar facing the light incident surface, each point light source is at least partially accommodated in a corresponding cavity.

5. A display device, comprising the backlight module according to claim 1.

6. A display device, comprising the backlight module according to claim 4.

7. A display device, comprising the backlight module according to claim 2.

8. A display device, comprising the backlight module according to claim 3.

9. The backlight module according to claim 1, wherein the distance between the light incident surface of the light incident region and the linear light source is about 0.1 millimeter to about 0.2 millimeter.

* * * * *